Figure 1:
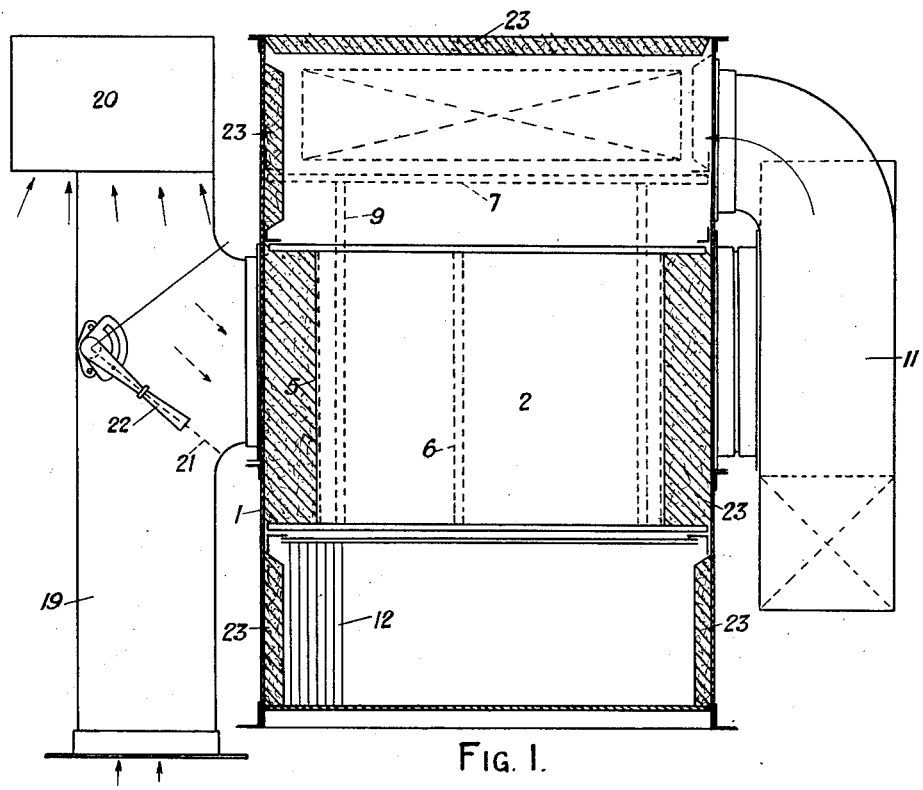

Dec. 29, 1931.  A. W. STEWART  1,838,466
COOLING AND VENTILATING APPARATUS
Filed Nov. 7, 1930  4 Sheets-Sheet 1

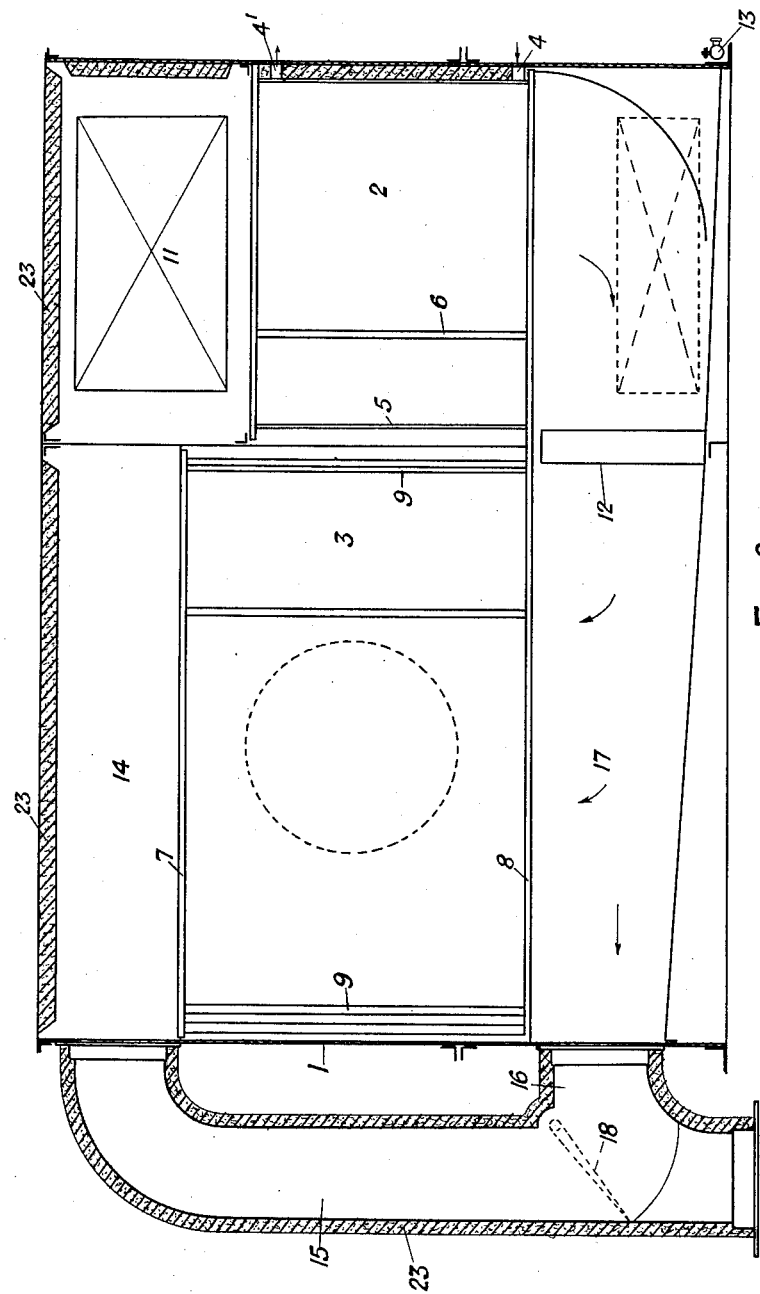

Dec. 29, 1931.  A. W. STEWART  1,838,466
COOLING AND VENTILATING APPARATUS
Filed Nov. 7, 1930  4 Sheets-Sheet 3

Patented Dec. 29, 1931

1,838,466

UNITED STATES PATENT OFFICE

ALEXANDER WILLIAM STEWART, OF GLASGOW, SCOTLAND

COOLING AND VENTILATING APPARATUS

Application filed November 7, 1930, Serial No. 493,949, and in Great Britain November 11, 1929.

This invention relates to improvements in apparatus for effecting artificial cooling of living rooms and other compartments, particularly on board ship, by means of conditioned air.

Usually, where air is cooled either by washing it with cold water or brine, or by passing it over surfaces cooled by mechanical refrigerating means, the ducts carrying the cooled air are reduced to a temperature below that of the dew point of the surrounding atmosphere and condensation takes place thereon. This condensation may be found so objectionable as to preclude the use of otherwise suitable cooling apparatus.

The present invention takes account of a physiological phenomenon with reference to the re-action of the human body in the atmosphere, namely that dry air at a high temperature may be more comfortable than air at a lower temperature but of a high degree of saturation. For instance, air at 72° F., dry bulb temperature and having a relative humidity of 28% is comparable as regards comfort with air at 63° F., dry bulb temperature and of 64% humidity. Numerous comparative instances with higher temperatures could be given.

Taking the above conditions into account the invention seeks to provide an apparatus which will efficiently extract moisture from the air without depressing the temperature so far as to cause condensation on the ducts carrying the conditioned air.

The apparatus comprises a casing containing a cooler and a regenerating dryer. The cooler may be supplied with cooling water or brine from a refrigerating plant or storage of cooling medium in which case the cooler may be in the form of a barrel receiving a nest of tubes or passages around which the cooling medium flows and through which the air to be cooled is passed, or vice versa, or the cooler may form the expansion chamber of a refrigerating plant in which cooling is by direct expansion. The regenerating dryer is disposed adjacent to the cooler and preferably consists of a casing traversed by a stack of tubes or passages around the outside of which atmospheric air is drawn by a centrifugal fan or the like to be discharged therefrom to the cooler. Beyond the cooler is a screen through which the cooled air passes from the cooler for the purpose of removing any condensation water carried over from the cooler.

The cooled air is passed through the tubes or passages of the dryer where it takes up heat from the atmospheric air being drawn externally of said tubes or passages into the fan. The dryer tubes or passages open into a casing from which a duct is led to the compartments or the like being cooled. A branch to the air outlet duct from the cooler allows a controlled proportion of the air leaving the cooler to by-pass the dryer, thus permitting control of the humidity.

A duct at the inlet to the dryer where the atmospheric air is drawn in may be fitted with a branch to the space being ventilated, a valve being fitted in said branch for controlling the proportion of air re-circulated from said space and that drawn fresh from the atmosphere.

By suitable selection of the area of the heat transfer surface in the cooler and in the dryer suitable degrees of cooling and de-humidification can be attained to suit the requirements of climatic conditions.

The walls of the casing containing the cooler and dryer are desirably insulated to prevent leakage of heat into the apparatus.

Figure 5:
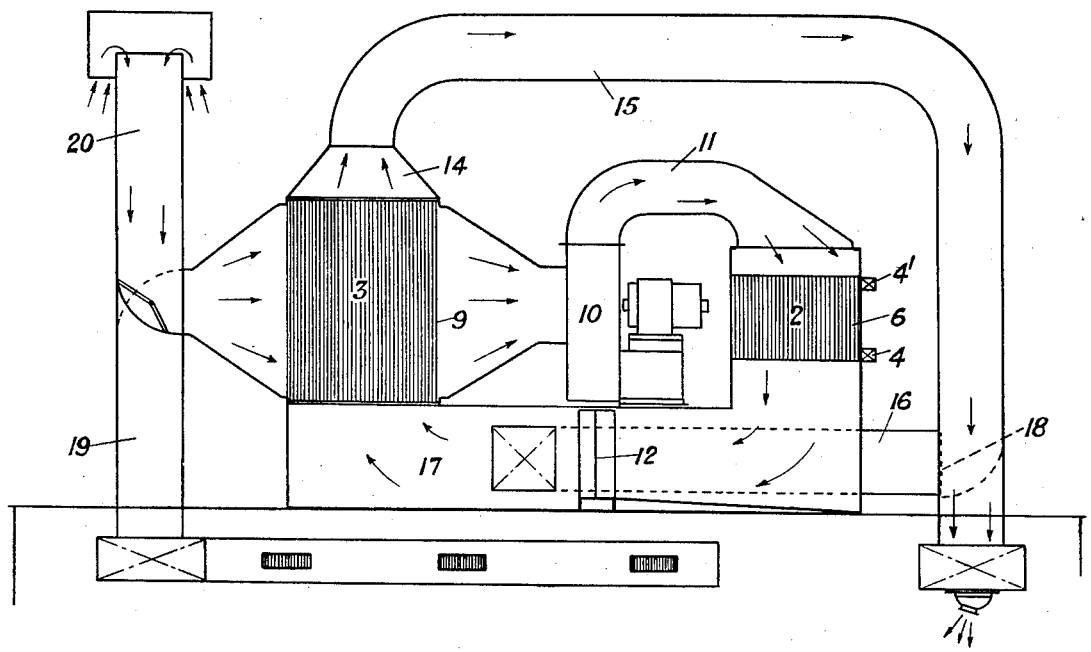
Figure 3:
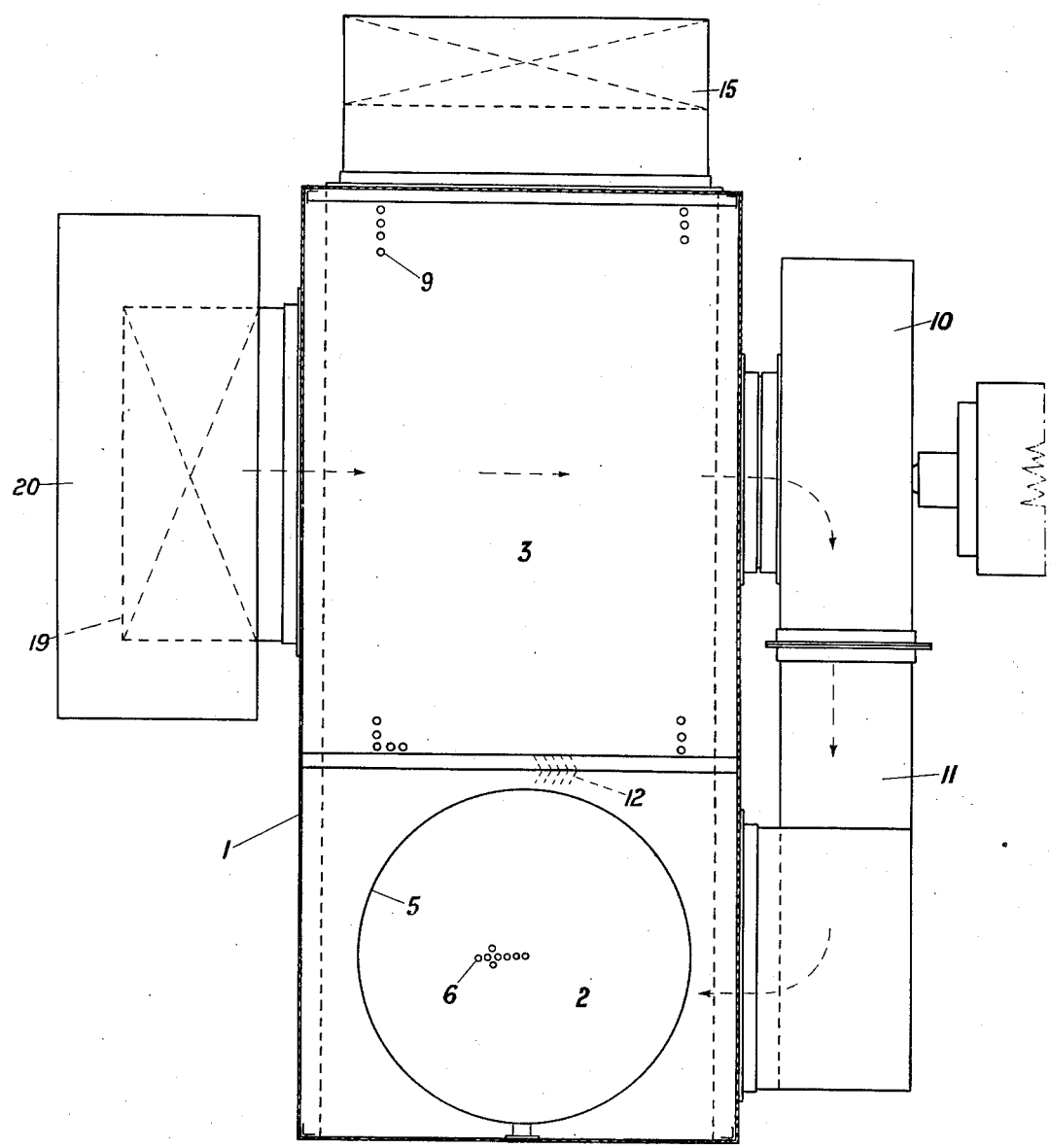
Figure 4:
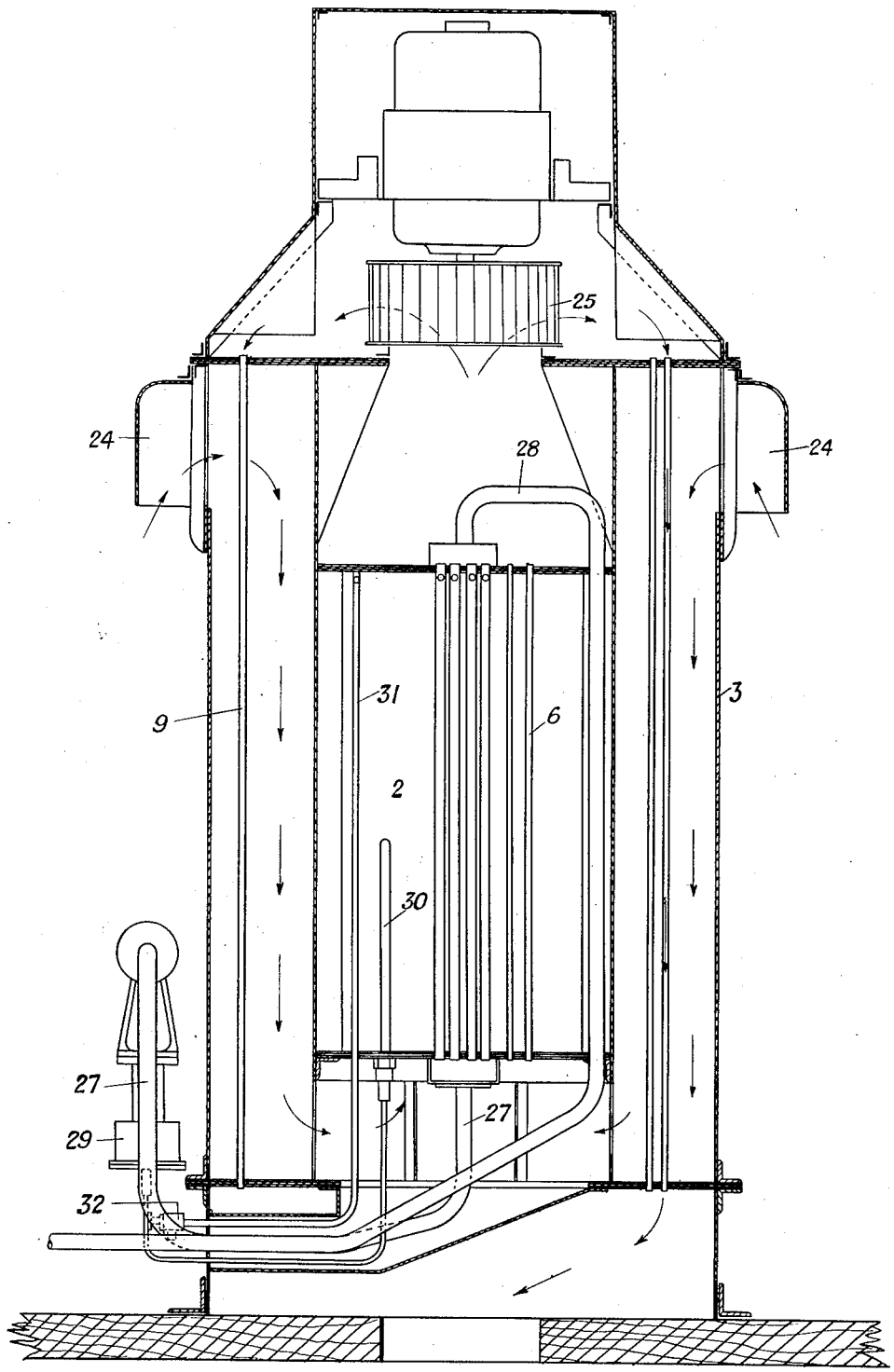

In the accompanying drawings Figs. 1, 2 and 3 are, respectively, a transverse section, a longitudinal section, and a part plan part horizontal section of an apparatus constructed in accordance with the invention. Fig. 4 is a vertical section showing a modification. Fig. 5 is a conventional diagram illustrating more clearly the air flow through the apparatus.

Similar reference characters denote similar parts in the several views.

The apparatus shown in Figs. 1, 2 and 3 comprises a casing 1 containing a cooler 2 and a regenerating dryer 3. The cooler 2 is supplied by way of an inlet connection 4 with cooling water or brine from a refrigerating plant or storage of cooling medium (not shown) and comprises a barrel 5 housing a nest of tubes 6 around which the cooling medium flows and through which the air to be cooled is passed. 4' denotes the outlet connection for the cooling medium from the cooler 2. The regenerating dryer 3 disposed alongside the cooler 2 comprises upper and lower tube plates 7, 8, respectively, between which extends a nest of tubes 9 around the outside of which atmospheric air is drawn by a centrifugal fan 10, being discharged therefrom by way of a duct 11 to the cooler 2. Beyond the cooler 2 is a screen 12 through which the cooled air passes from the cooler for the purpose of removing any condensation water carried over from the cooler, there being provided a drain valve 13 for draining off any condensate.

The cooled air is passed through the tubes 9 of the dryer 3 where it takes up heat from the atmospheric air being drawn round the outside of the tubes 9 into the fan 10. The tubes 9 open into a top chamber 14 from which a duct 15 is led to the compartment or the like being cooled. A branch 16 to a chamber 17 below the dryer 3 is controlled by a damper 18 manually regulatable to allow a proportion of the air leaving the cooler 2 to by-pass the regenerator 3, thus permitting control of the humidity. In lieu of a manually regulatable damper, a by-pass valve controlled automatically by a thermostat or a humidistat may be provided for the purpose.

A duct 19 forming a continuation of the inlet 20 to the dryer 3 where the atmospheric air is drawn in communicates with the compartments being ventilated and is fitted with a damper 21 regulatable manually by means of a handle 22 to determine the proportion of air re-circulated from said compartments and that drawn fresh from the atmosphere. In lieu of a manually regulatable damper 21, a valve controlled automatically by means of a thermostat or a humidistat may be provided for the purpose.

The inner surfaces of the casing 1 and the outer surfaces of the ducts 15, 16 are covered with insulating material 23 to prevent leakage of heat into the apparatus.

Fig. 4 shows a modified construction of apparatus including a cylindrical cooler 2 surrounded by an annular regenerating dryer 3. Air enters the dryer 3 at 24 and is drawn by a centrifugal fan 25 downwardly around the outside of the dryer tubes 9 and upwardly through the cooler tubes 6, and is discharged from the fan 25 downwardly through the dryer tubes 9 whence it passes by way of a discharge opening 26 to the compartments or the like being ventilated.

27 and 28 denote, respectively, cooling medium inlet and outlet pipes for the cooler 2.

29 denotes a thermostatic temperature regulator adapted to control the supply of cooling medium to the cooler 2 and having a thermostatic element 30 extending within the cooler.

31 denotes an expansion pipe located within the cooler 2 and terminating exteriorly thereof in a relief valve 32.

In the conventional diagram shown in Fig. 5 the several parts of the apparatus are separated in order to illustrate more clearly the air flow therethrough. The diagram will easily be understood without further explanation.

I claim:—

Apparatus for the purpose specified comprising, in combination, a cooler, a regenerating dryer, means for drawing atmospheric air over one heat transfer surface of said dryer and discharging such air to the cooler, a connection for passage of air from said cooler to another heat transfer surface of said dryer, a connection for discharge of air from said last mentioned heat transfer surface to the space to be ventilated, and means whereby a controlled fraction of the air from said cooler may be caused to by-pass said second mentioned heat transfer surface.

In testimony whereof I have signed my name to this specification.

ALEXANDER WILLIAM STEWART.